United States Patent
Strahorn et al.

[11] Patent Number: 5,933,140
[45] Date of Patent: Aug. 3, 1999

[54] CHILD WINDOW CONTAINING CONTEXT-BASED HELP AND A MINIATURIZED WEB PAGE

[75] Inventors: Chris Strahorn, Menlo Park; Michael Wookey, Sunnyvale, both of Calif.

[73] Assignee: Sun Microsystems, Inc., Palo Alto, Calif.

[21] Appl. No.: 08/885,808

[22] Filed: Jun. 30, 1997

[51] Int. Cl.$^6$ .................................................... G06F 3/00
[52] U.S. Cl. .......................... 345/338; 345/346; 345/329
[58] Field of Search .................. 345/326–358; 434/118; 395/200.47–200.49, 200.33

[56] References Cited

U.S. PATENT DOCUMENTS

| | | | |
|---|---|---|---|
| 4,974,173 | 11/1990 | Stefik et al. | 345/332 |
| 5,001,697 | 3/1991 | Torres | 345/342 |
| 5,390,295 | 2/1995 | Bates et al. | 345/342 |
| 5,408,655 | 4/1995 | Oren et al. | 345/336 X |
| 5,436,637 | 7/1995 | Gayraud et al. | 345/338 |
| 5,493,658 | 2/1996 | Chiang et al. | 345/338 |
| 5,760,771 | 6/1998 | Bonder et al. | 345/336 |

*Primary Examiner*—John E. Breene
*Attorney, Agent, or Firm*—Finnegan, Henderson, Farabow, Garrett & Dunner, L.L.P.

[57] ABSTRACT

A non-interruptive, context-based help system and method for use in a WorldWideWeb based environment includes links to help software that, when activated, tracks the user's position and simultaneously displays a miniaturized depiction of the active Web page in a child window with help information appropriate to the active Web page. The user may select portions of the miniaturized depiction, causing the help software to display help information specific to the selected portion of the page. Preferably, the help software is a Java™ application or applet.

24 Claims, 3 Drawing Sheets

CHILD WINDOW CONTAINING CONTEXT-BASED HELP AND A MINIATURIZED WEB PAGE

BACKGROUND OF THE INVNTION

The present disclosure relates generally to computer software, and more particularly, to context based help in a WorldWideWeb environment.

One of the more significant developments in the computing industry in the last few years has been the emergence of the WorldWideWeb. With the Web, a computer operator, equipped with an appropriately connected computer and a software package called a browser, can explore vast amounts of information stored on computers around the world. Navigating the Web is relatively simple, typically requiring only clicking a computer mouse to move between Web documents, even when the documents are located at separate locations.

HTML (HyperText Markup Language) is a language used to provide information on the Web. HTML provides a rich lexicon and syntax for designing and creating useful hypertext and hypermedia documents. With HTML, Web page designers can describe the format and content of a Web document, which may include, for example, text files, graphics files, and multimedia files. When accessed by a client computer (i.e., the computer local to the browser), the HTML file is transmitted to the client computer over a network such as the Internet and interpreted by the browser.

As Web pages become increasingly more complex, Web page designers often find it necessary to make some form of instructional, or "help," information optionally available to the user. For example, a user attempting to enter information into a Web page organized as an order form may wish to know more about a certain field of the form. Typically, help information for a Web page requires loading a new HTML page into the browser, and when the user is done reading the help information, loading the original HTML page back into the browser. This interrupts the display and is generally inconvenient.

Other conventional, non-Web-based software help facilities provide access to help documentation to users in a number of ways, including: (1) providing help based on the location where the user was when help was requested, (2) providing a table of contents, and (3) using some type of search tool. These methods, at best, provide an initial help document for the user. Often times, however, the user finds it difficult to find help information as the user continues to use the program.

Thus, there is a need for a Web-based help system that overcomes the limitations of conventional help facilities and does not interrupt the Web page being displayed.

SUMMARY OF THE INVENTION

A help program called through hyperlinks from a Web page monitors the active Web page and generates, in a "child" window, a miniaturized depiction of the active Web page and corresponding help information. As the active Web page changes, the miniaturized depiction in the child window changes accordingly.

The advantages and purposes of this the invention will be set forth in the following description and will also be obvious from the description, or may be learned by practicing the invention. The advantages and purpose of the invention will be realized and attained by means of the elements and combinations particularly pointed out in the appended claims.

A process consistent with this invention generates help information for software and comprises the steps of: (1) generating, in response to a request for help, a child window containing a miniaturized depiction of an active WorldWideWeb page and help information related to the active page; (2) changing the miniaturized depiction to reflect changes in the page; and (3) displaying the child window. Additionally, a computer readable medium is provided containing computer instructions for executing the above process.

An alternate aspect of the present invention include a computer system comprising a monitor, a memory, and a processor. The memory includes a browser program configured to retrieve and display active pages and a help program configured to generate a child window containing a miniaturized depiction of the active pages and help information relating to the active pages, for monitoring the active pages, and for changing the miniaturized depiction of the active pages to reflect changes in the active pages.

A still further aspect of the present invention is a computer system having a server and a network. The server includes pages comprising a plurality of HyperText Markup Language ("HTML") files, a first one of the HTML files containing links to a Java™ program containing instructions for: generating a child window containing a miniaturized depiction of an active page, monitoring the active page, changing the miniaturized depiction as the active page changes, and displaying, in the child window, help information relating to the active page. The HTML files and the Java™ program may be transferred on the network in response to a request by a second computer system.

A final aspect of the present invention is a computer network comprising a client computer, a server computer, and a network. The client includes a memory and a processor, the memory including a browser program configured to retrieve and display active pages and a help program configured to generate a child window containing a miniaturized depiction of the active pages and help information relating to the active pages, for monitoring the active pages, and for changing the miniaturized depiction of the active pages to reflect changes in the active pages. The server computer includes pages comprising a plurality of HyperText Markup Language ("HTML") files, a first one of the HTML files containing links to the help program, and the network transferring the HTML files and the help program from the server to the client, the HTML files being displayed on the client as the active pages.

Both the foregoing general description and the following detailed description are exemplary and explanatory only and do not restrict the invention, as claimed.

BRIEF DESCRIPTION OF THE DRAWINGS

The accompanying drawings, which are incorporated in and constitute a part of this specification, illustrate embodiments of the invention and, together with the description, help to explain the principles of the invention. In the drawings.

DETAILED DESCRIPTION

Reference will now be made in detail to the embodiments consistent with the invention, examples of which are illustrated in the accompanying drawings. Wherever possible, the same reference numbers used throughout the drawings refer to the same or like parts.

The following disclosure describes a non-interruptive, context-based help system and method for use in a Web based environment. A Web page consistent with the present invention includes links to help software that, when activated, keeps track of the active Web page and displays a miniaturized version of it in a child window. Additionally, the help software also displays, in the child window, help information appropriate to the active Web page, typically in the form of textual information. The user may select portions of the miniaturized depiction, causing the help software to display help information specific to the selected portion. Preferably, the help software is a Java™ application or applet.

Figure 1:
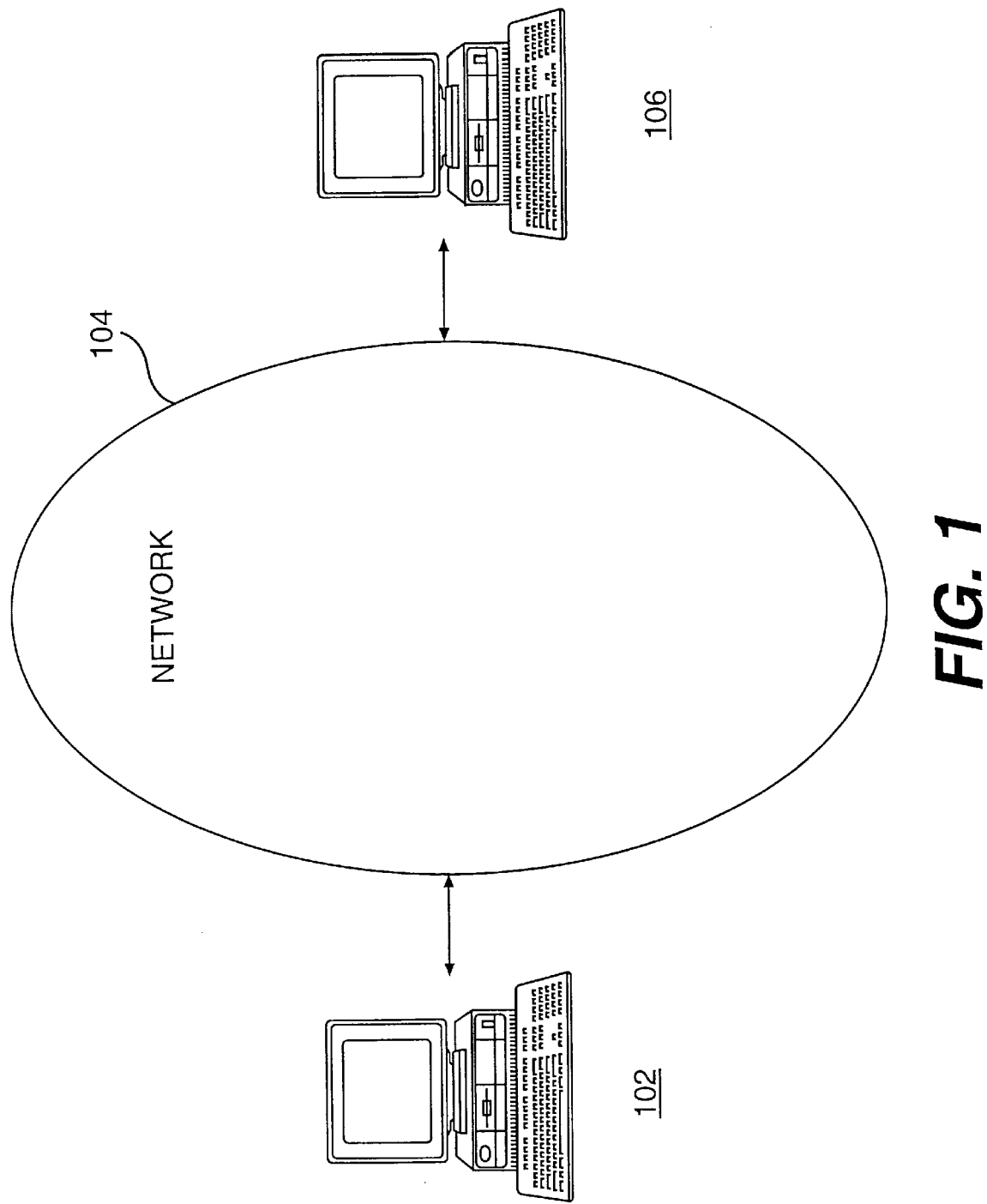
FIG. 1 is a high level diagram of an exemplary client/server computing system on which the present invention may be implemented.

FIG. 1 is a high level diagram of an exemplary computing system network on which the present invention may be implemented. The system includes a Web server 102 storing Web pages, and a client computer 106 capable of accessing the Web pages on server 102. Server 102 may be any of a number of known computers, or network of computers, capable of hosting a Web site. Similarly, client 106 may be any of a number of known computers, or network of computers, capable of supporting a Web browser. Server 102 and client 106 are coupled to one another via a network 104, such as the Internet.

To retrieve a Web page stored on server 102, the user of client 106 specifies a URL (uniform resource locator). The specified URL allows Web browsing software running on client 106 to initiate communication with server 102 and access the desired HTML page, which a browser interprets and displays on client 106.

Figure 2:
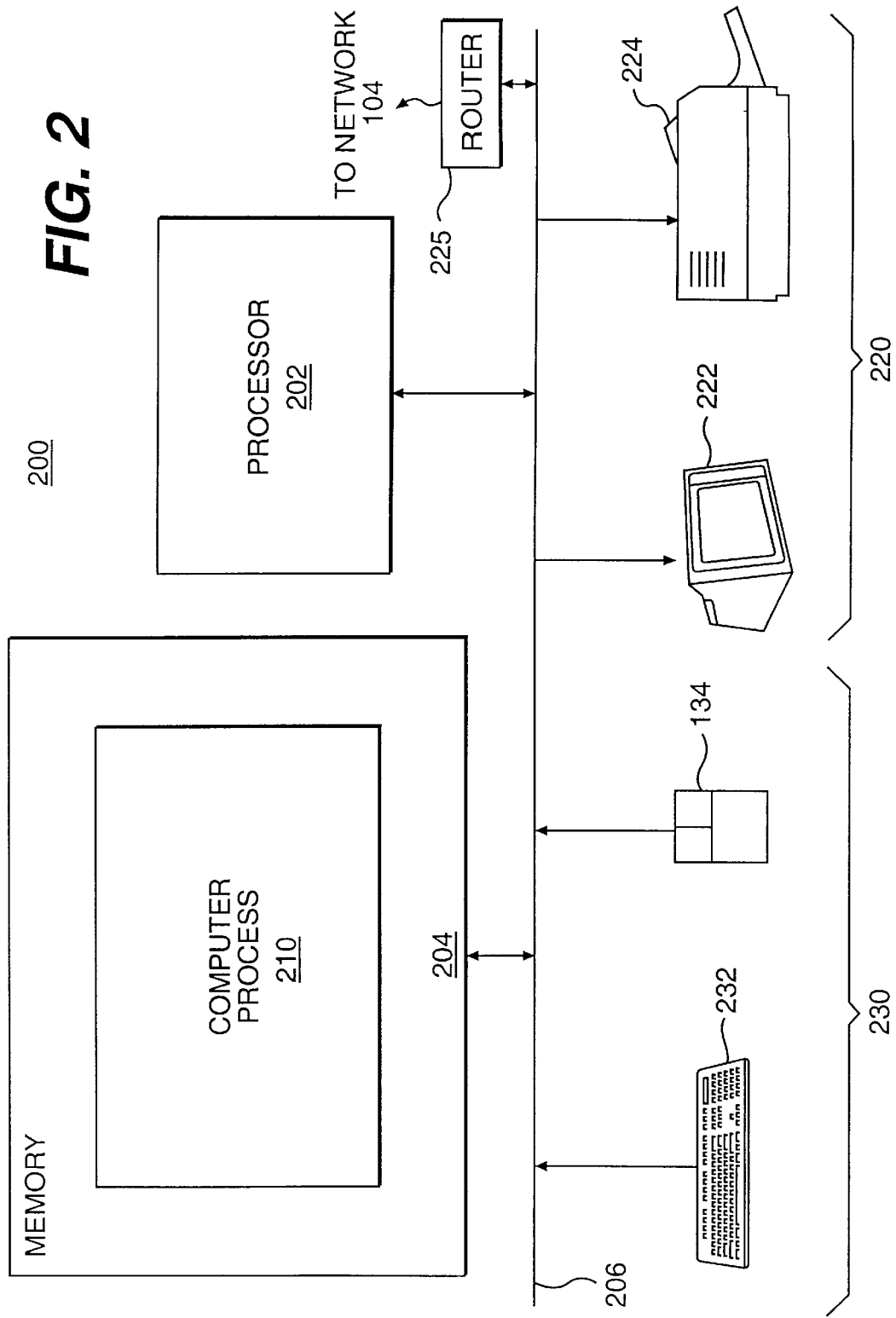
FIG. 2 is a diagram of a computer system that is a client or a server in the system of FIG. 1.

FIG. 2 is a more detailed diagram of a computer system 200, which may be client 106 or server 102. Computer system 200 includes a processor 202 and a memory 204 coupled to processor 202 through a bus 206. Processor 202 fetches computer instructions from memory 204 and executes those instructions. Processor 202 also (1) reads data from and writes data to memory 204, (2) sends data and control signals through bus 206 to one or more computer output devices 220, (3) receives data and control signals through bus 206 from one or more computer input devices 230 in accordance with the computer instructions, and (4) transmits and receives data through bus 206 and router 225 to network 104.

Memory 204 can include any type of computer memory including, without limitation, random access memory (RAM), read-only memory (ROM), and storage devices that include storage media such as magnetic and/or optical disks. Memory 204 includes a computer process 210, such as a Web browser or Web server software. A computer process includes a collection of computer instructions and data that collectively define a task performed by computer system 200.

Computer output devices 220 can include any type of computer output device, such as a printer 224, a cathode ray tube (CRT) 222 (alternatively called a monitor or display), a light-emitting diode (LED) display, or a liquid crystal display (LCD). CRT display 222 preferably displays the graphical and textual information of the Web browser. Each of computer output devices 220 receives from processor 202 control signals and data and, in response to such control signals, displays the received data.

User input devices 230 can include any type of user input device such as a keyboard 232, or keypad, or a pointing device, such as an electronic mouse 234, a trackball, a lightpen, a touch-sensitive pad, a digitizing tablet, thumb wheels, or a joystick. Each of user input devices 230 generates signals in response to physical manipulation by a user and transmits those signals through bus 206 to processor 202.

As previously discussed, to view a Web page on client 106, the user specifies, via a URL, the location of the desired Web page. The browser on client 106 then retrieves the HTML file for the specified Web page, interprets the file, and displays it as a Web page.

Figure 3:
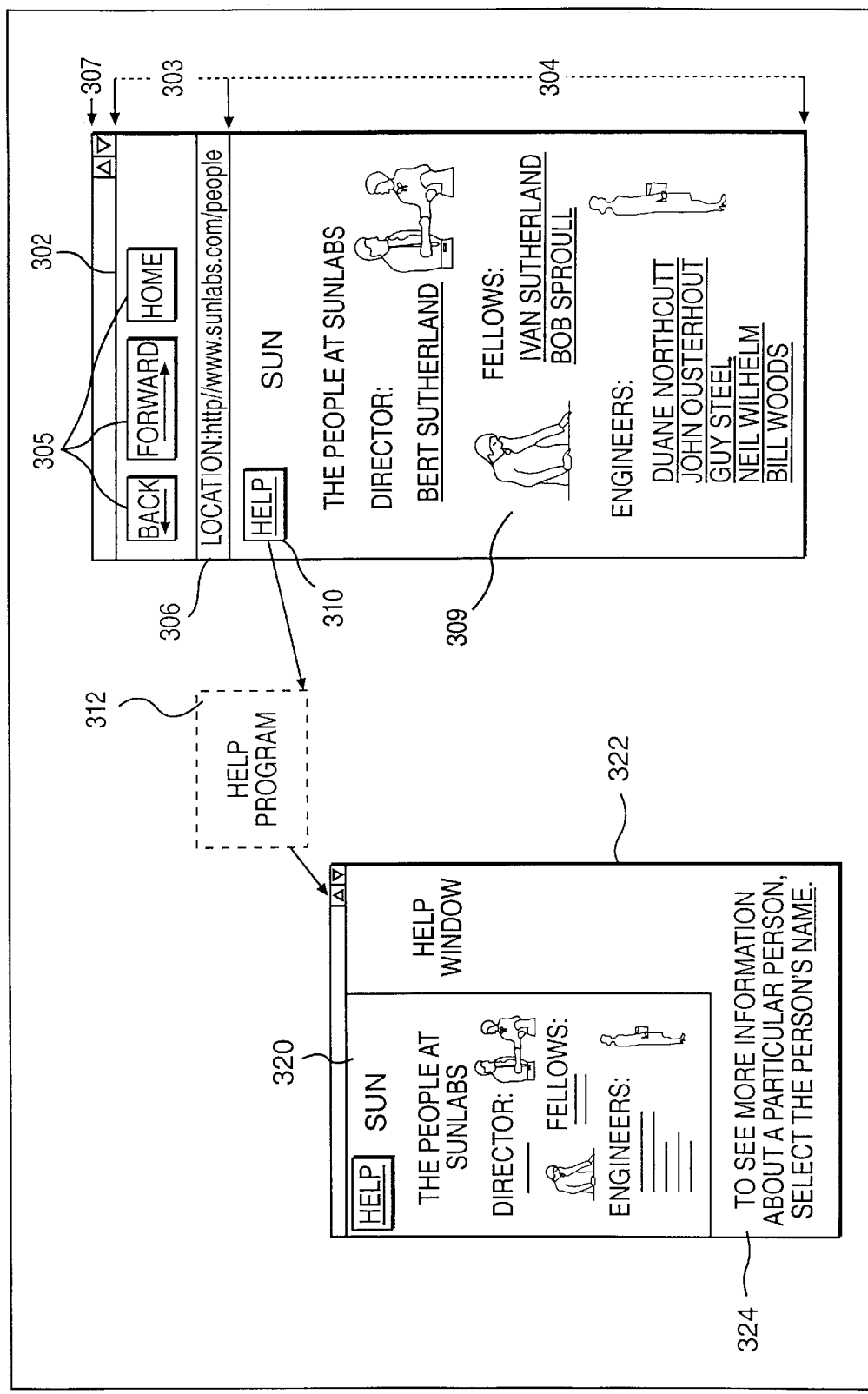
FIG. 3 illustrates the interaction the software components according to the present invention.

FIG. 3 illustrates the interaction, according to the present invention, of browser 302 and other software components as these software components are shown on the computer display or monitor 222. As shown, a browser (illustrated as browser GUI 302) includes a control section 303, an active page display section 304, and a standard GUI interface section 307. Control section 303 includes software buttons 305 for initiating browser commands such as BACK (go back to the last Web page), FORWARD (go forward to the next Web page), and HOME (go to a preset "home" Web site); and a section 306 that displays the current URL. As shown in FIG. 3, the URL references the Web page named "people," located on the server with the Internet domain name "sunlabs.com." The content of the "people" Web page is depicted in display section 304, and includes graphics, such as picture 309, and text. Each hyperlinked entry on the Web page, shown underlined, is associated with its own URL, which may be selected and accessed.

The Web page further includes a hyperlinked help button 310 that, when selected by the user, invokes a help program 312. Help program 312 is preferably a Java™ program retrieved from the server when invoked, and running on a Java™ interpreter in the browser or operating system of client 106. Help program 312 monitors the active Web page, and accordingly generates and updates child window 322, which includes a miniaturized depiction 320 of the active page and help information 324 specific to the active page. Miniaturized depiction 320 is preferably not a Web page per se, but merely a rasterized depiction of the active Web page. As the user navigates through various Web pages, program 312 changes depiction 320 and help information 324 accordingly.

When the user selects a section of depiction 320, for example, using a mouse, program 312 retrieves help information from server 102 specific to the section selected, and if new help information is available, program 312 updates help information section 324. For example, selecting the "SUN" or "The People at SunLabs" section of depiction 320 may cause program 312 to retrieve text such as that shown in section 324, while clicking on the "Engineers" or "Fellows" section retrieves information related to these topics. Alternatively, instead of retrieving new help information from server 102 each time a new help section is selected, program 312 may initially download all the available information for the active page. Further, as indicated by the underlined words in help section 324, the help information itself may be hyperlinked.

Browser 302 and child window 322 preferably display their output on a device such as CRT 222 of the client computer as windows in a conventional graphical user interface. Help program 312 is shown in FIG. 3 with dashed lines to conceptually show the link between browser 302 and child window 322, but help program 312 is not normally shown on the display as a full-blown window.

As described above, a non-interruptive, context-based Web help facility provides readily accessible, intuitive help information to the user of Web browser software. The help program is preferably a Java™ program stored and the Web server and linked to an HTML file. The help program monitors the active Web pages and provides help information accordingly.

It will be apparent to those skilled in the art that various modifications and variations can be made to the present invention without departing from the scope or spirit of the invention. Other embodiments of the invention will be apparent to those skilled in the art from consideration of the specification and practice of the invention disclosed herein. The specification and examples are exemplary only. The true scope and spirit of the invention is instead indicated by the following claims and their equivalents.

What is claimed is:

1. A process for generating help information on a client computer comprising the steps of:

generating, in response to a request for help, a child window containing a miniaturized depiction of an active WorldWideWeb page and help information related to the active page;

changing the miniaturized depiction to reflect changes in the page; and displaying the child window.

2. The method of claim 1, wherein the step of displaying the child window further comprises the step of:

displaying help information specific to a portion of the WorldWideWeb page.

3. The method of claim 2, wherein the step of displaying the child window further comprises the step of:

displaying the help information specific to a portion of the WorldWideWeb page according to a selected region of the child window.

4. The method of claim 1, wherein the generating step further includes the step of calling an applet.

5. The method of claim 1, wherein the help information contains hyperlinked text.

6. A computer system comprising:

a monitor;

a memory including a browser program configured to retrieve and display active pages and a help program configured to generate a child window containing a miniaturized depiction of the active pages and help information relating to the active pages, for monitoring the active pages, and for changing the miniaturized depiction of the active pages to reflect changes in the active pages; and a processor configured to execute the browser program and the help program in the memory of the computer system and display information on the monitor.

7. The computer system of claim 6, wherein the help program includes computer code written in the Java programming language.

8. The computer system of claim 6, wherein the browser program includes computer code designed to retrieve pages for the browser from the WorldWideWeb.

9. The computer system of claim 8, wherein the help program further includes computer code designed to display help information specific to a portion of the active page.

10. The computer system of claim 9, wherein the help program further includes computer code designed to display the help information specific to a portion of the active page according to a selected region of the child window.

11. The computer system of claim 6, wherein the child window includes hyperlinked information.

12. A computer readable medium containing instructions executable on a computer, the instructions when executed on the computer performing the steps of:

generating, in response to a request for help, a child window containing a miniaturized depiction of an active WorldWideWeb page and help information related to the active page;

changing the miniaturized depiction to reflect changes in the page; and displaying the child window.

13. The computer readable medium of claim 12, further including instructions for displaying help information specific to a portion of the WorldWideWeb page.

14. The computer readable medium of claim 13, further including instructions for displaying the help information specific to a portion of the WorldWideWeb page according to a selected region of the child window.

15. The computer readable medium of claim 12, further including instructions for calling an applet.

16. The computer readable medium of claim 12, wherein the help information contains hyperlinked text.

17. A computer system comprising:

a server including pages comprising a plurality of HyperText Markup Language ("HTML") files, a first one of the HTML files containing links to an applet containing instructions for: generating a child window containing a miniaturized depiction of an active page, monitoring the active page, changing the miniaturized depiction as the active page changes, and displaying, in the child window, help information relating to the active page; and a network over which the HTML files and the applet are transferred to a second computer system when the HTML files and the applet are requested by the second computer system.

18. The computer system of claim 17, wherein the applet further includes instructions for displaying help information specific to a portion of the WorldWideWeb page.

19. The computer system of claim 18, wherein the applet further includes instructions for displaying the help information specific to a portion of the WorldWideWeb page according to a selected region of the child window.

20. The computer system of claim 17, wherein the help information contains hypertext links.

21. A computer network comprising:

a client computer including:

a memory including a browser program configured to retrieve and display active pages and a help program configured to generate a child window containing a miniaturized depiction of the active pages and help information relating to the active pages, for monitoring the active pages, and for changing the miniaturized depiction of the active pages to reflect changes in the active pages; and a processor configured to execute the browser program and the help program in the memory of the client computer;

a server computer including pages comprising a plurality of HyperText Markup Language ("HTML") files, a first one of the HTML files containing links to the help program; and a network for transferring the HTML files and the help program from the server to the client, the HTML files being displayed on the client as the active pages.

22. The computer system of claim 21, wherein the help program includes computer code written in the Java programming language.

23. The computer system of claim 21, wherein the help program further includes computer code designed to display help information specific to a portion of the active page.

24. The computer system of claim 23, wherein the help program further includes computer code designed to display the help information specific to a portion of the active page according to a selected region in the child window.

* * * * *